UNITED STATES PATENT OFFICE.

JOHN D. PENNOCK, OF SYRACUSE, NEW YORK, ASSIGNOR TO THE SOLVAY PROCESS COMPANY, A CORPORATION OF NEW YORK.

PROCESS OF PRODUCING FILLING MATERIAL.

No. 805,581.

Specification of Letters Patent.

Patented Nov. 28, 1905.

Application filed June 8, 1904. Serial No. 211,639.

*To all whom it may concern:*

Be it known that I, JOHN D. PENNOCK, a citizen of the United States, residing at Syracuse, in the county of Onondaga and State of New York, have invented a new and useful Process of Producing a Filling Material, of which the following is a specification.

My invention relates to improvements in the process of producing a filling material.

The object of my invention is to manufacture from natural products a filling material free from impurities and by means which shall not render such production prohibitive by reason of its cost.

Recent industries utilize in very considerable quantities materials which are naturally inert from the chemical point of view, but which by reason of their physical qualities of color, fineness, homogeneity, &c., are useful as vehicles or filling materials in the manufacture of rubber, paint, paper, plaster, &c.—such, for example, as sulfate of lime, sulfate of baryta, kaolin, chalk, &c.

The object of my invention is the artificial production of one of these materials—calcium carbonate. This chemically is the same as the ground natural product chalk and limestone; but both of these materials when ground or even floated contain impurities which make them unsuitable for particular purposes and are of a different form of crystallization from the one herein described.

My process, on the contrary, consists in causing these materials to enter into a chemical combination which permits me to deal only with a compound of pure calcium, then by means of an appropriate precipitation to withdraw them from such combination. In this manner is obtained a substance which is perfectly white and of extreme lightness, with a possibility of varying the grain according to the conditions of the precipitation and according to the uses for which the product is intended.

The product obtained by my process is soft, flaky, and light, due to the gradual precipitation made possible by the introduction of gases into a soluble salt of calcium. Said product is especially adapted to a wide range of commercial use—such, for instance, as in the manufactures above referred to.

My process consists in passing carbonic-acid and ammonia gas simultaneously into a concentrated solution of calcium chlorid. I provide a concentrated solution of calcium chlorid either by dissolving the soluble calcium chlorid or by concentrating to 40° Baumé the waste liquors from distillers of the ammonia-soda process. Into this solution I pass carbonic acid and dry ammonia simultaneously, maintaining the temperature of said solution preferably at approximately 80° centigrade and continuing the action of the carbonic-acid and ammonia gas until all the calcium of the calcium chlorid is precipitated as calcium carbonate. After the settling at 80° centigrade of the precipitated calcium carbonate the ammonium-chlorid solution may be decanted to a crystallizing-reservoir, where the bulky crystallization of ammonium chlorid as a by-product takes place. The precipitated calcium carbonate may then be filtered and washed and then dried with the air at a temperature preferably of approximately 80° centigrade.

By this process a large yield may be obtained of a pure by-product of ammonium-chlorid absolutely free from other salt by simply cooling down to the temperature of the atmosphere and without evaporation in lead.

The precipitated chalk is in the form of arragonite and not calcite. Arragonite is the form which is desirable.

By varying the temperatures the concentration, the rapidity of mixture, agitation, or introducing foreign salts it is possible to largely influence the physical character of the precipitates, and thus several degrees of fineness may be obtained.

What I claim is—

1. The process of producing a filling material, which consists in passing carbonic acid and dry ammonia simultaneously into a concentrated solution of calcium chlorid, maintaining at a suitable temperature the solution and continuing the action of the carbonic-acid gas and the ammonia gas until all the calcium of the calcium chlorid is precipitated as calcium carbonate.

2. The process of producing a filling material, which consists in passing carbonic acid and dry ammonia simultaneously into a concentrated solution of calcium chlorid, maintaining at a suitable temperature the solution, continuing the action of the carbonic-acid gas and the ammonia gas until all the calcium of the calcium chlorid is precipitated as calcium carbonate, and filtering and washing the precipitated calcium carbonate.

3. The process of producing a filling material, which consists in passing carbonic acid and dry ammonia simultaneously into a concentrated solution of calcium chlorid, maintaining at a suitable temperature the solution, continuing the action of the carbonic-acid gas and the ammonia gas until all the calcium of the calcium chlorid is precipitated as calcium carbonate, and filtering, washing and drying the precipitated calcium carbonate.

4. The process of producing a filling material, which consists in passing carbonic acid and dry ammonia simultaneously into a concentrated solution of calcium chlorid, maintaining at a suitable temperature the solution, continuing the action of the carbonic-acid gas and the ammonia gas until all the calcium of the calcium chlorid is precipitated as calcium carbonate, and filtering, washing and drying the precipitated calcium carbonate with the air heated to a suitable temperature.

5. The process of producing a filling material, which consists in passing carbonic acid and dry ammonia simultaneously into a concentrated solution of calcium chlorid, maintaining at a suitable temperature the solution, continuing the action of the carbonic-acid gas and the ammonia gas until all the calcium of the calcium chlorid is precipitated as calcium carbonate, settling at suitable temperature and decanting the ammonium-chlorid solution to a crystallizing-reservoir.

6. The process of producing a filling material, which consists in passing carbonic acid and dry ammonia simultaneously into a concentrated solution of calcium chlorid, maintaining at a suitable temperature the solution, continuing the action of carbonic-acid gas and the ammonia gas until all the calcium of the calcium chlorid is precipitated as calcium carbonate, settling at a suitable temperature and decanting the ammonium-chlorid solution to a crystallizing-reservoir, and filtering and washing the precipitated calcium carbonate.

7. The process of producing a filling material, which consists in passing carbonic acid and dry ammonia simultaneously into a concentrated solution of calcium chlorid, maintaining at a suitable temperature the solution, continuing the action of the carbonic-acid gas and the ammonia gas until all the calcium of the calcium chlorid is precipitated as calcium carbonate, settling at a suitable temperature and decanting the ammonium-chlorid solution to a crystallizing-reservoir, and filtering, washing and drying of the precipitated calcium carbonate.

JOHN D. PENNOCK.

Witnesses:
  H. A. FLINT,
  E. J. DAVIS.